United States Patent
Nastasi et al.

[11] Patent Number: 6,129,308
[45] Date of Patent: Oct. 10, 2000

[54] DELTA-SHAPED AIRCRAFT WITH VARIABLE CAMBER FUSELAGE AND WING

[75] Inventors: Richard F. Nastasi, Commack; Walter S. Soeder, Patchogue, both of N.Y.

[73] Assignee: Northrop Grumman Corporation, Los Angeles, Calif.

[21] Appl. No.: 09/157,745

[22] Filed: Sep. 21, 1998

[51] Int. Cl.$^7$ .................................................. B64C 1/00
[52] U.S. Cl. ............................ 244/36; 244/219; 244/201
[58] Field of Search ............................ 244/36, 219, 39, 244/201, 45 R, 216

[56] References Cited

U.S. PATENT DOCUMENTS

| | | | |
|---|---|---|---|
| 1,325,377 | 12/1919 | Richards . | |
| 2,142,997 | 1/1939 | Case | 244/121 |
| 2,376,780 | 5/1945 | Kenyon | 244/87 |
| 2,735,701 | 2/1956 | Horton | 244/36 |
| 2,736,523 | 2/1956 | Chaplin | 244/140 |
| 2,778,586 | 1/1957 | Nyerges et al. | 244/120 |
| 2,872,137 | 2/1959 | Gluhareff | 244/120 |
| 3,047,255 | 7/1962 | Wallis | 244/55 |
| 3,064,928 | 11/1962 | Toll | 244/46 |
| 3,114,525 | 12/1963 | Morgan et al. | 244/120 |
| 3,155,344 | 11/1964 | Vogt | 244/46 |
| 3,171,620 | 3/1965 | Walley et al. | 244/120 |
| 3,288,400 | 11/1966 | Nazir | 244/43 |
| 3,433,439 | 3/1969 | Brame et al. | 244/120 |
| 3,447,761 | 6/1969 | Whitener et al. | 244/15 |
| 3,698,668 | 10/1972 | Cole | 244/44 |
| 3,776,489 | 12/1973 | Wen et al. | 244/1 N |
| 3,955,781 | 5/1976 | Tupolev et al. | 244/13 |
| 4,008,867 | 2/1977 | Kaniut | 244/87 |
| 4,053,124 | 10/1977 | Cole | 244/219 |
| 4,113,210 | 9/1978 | Pierce | 244/219 |
| 4,194,708 | 3/1980 | Tracy et al. | 244/15 |
| 4,351,502 | 9/1982 | Statkus | 244/219 |
| 4,483,497 | 11/1984 | Rethorst | 244/15 |
| 4,735,381 | 4/1988 | Wood | 244/130 |
| 5,082,204 | 1/1992 | Croston | 244/36 |
| 5,222,699 | 6/1993 | Albach et al. | 244/219 |
| 5,322,242 | 6/1994 | Tracy | 244/36 |
| 5,518,204 | 5/1996 | Tracy | 244/36 |
| 5,538,201 | 7/1996 | Gerhardt | 244/204 |
| 5,813,628 | 9/1998 | Hahl | 244/36 |
| 5,897,076 | 4/1999 | Tracy | 244/36 |

FOREIGN PATENT DOCUMENTS

WO 9411248  5/1994  WIPO ...................................... 244/55

*Primary Examiner*—J. Woodrow Eldred
*Attorney, Agent, or Firm*—Terry J. Anderson; Karl J. Hoch, Jr.

[57] ABSTRACT

In accordance with the present invention, there is provided a variable camber delta-shaped aircraft. The aircraft is provided with an integrated fuselage/wing generally defining the aircraft and having longitudinal and lateral axes. The fuselage/wing has a forward section which is rotably attached to an aft section about the lateral axis. The aircraft is further provided with an aerodynamic lifting surface which is disposed about the fuselage/wing and defined by a camber. The forward section has a downwardly deflected position when rotated relative to the aft section. The forward and aft sections are cooperatively formed to increase the camber of the lifting surface when the forward section is in the deflected position.

11 Claims, 2 Drawing Sheets

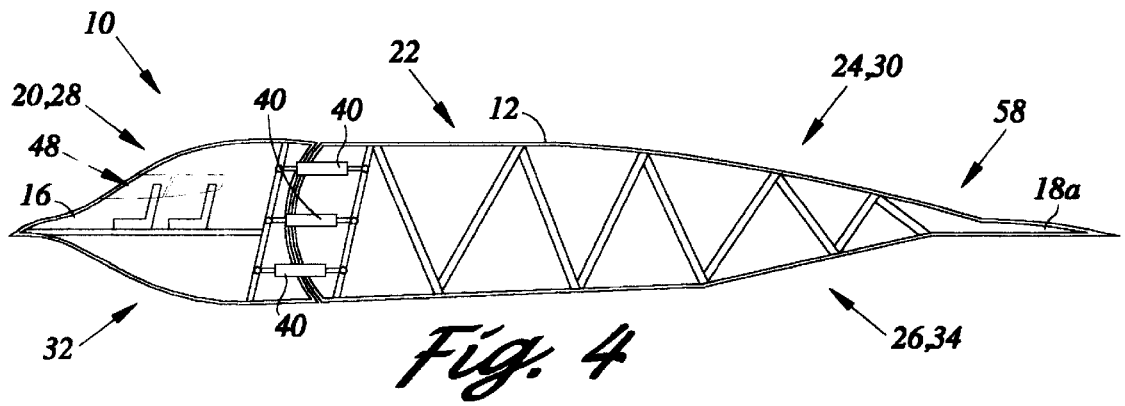
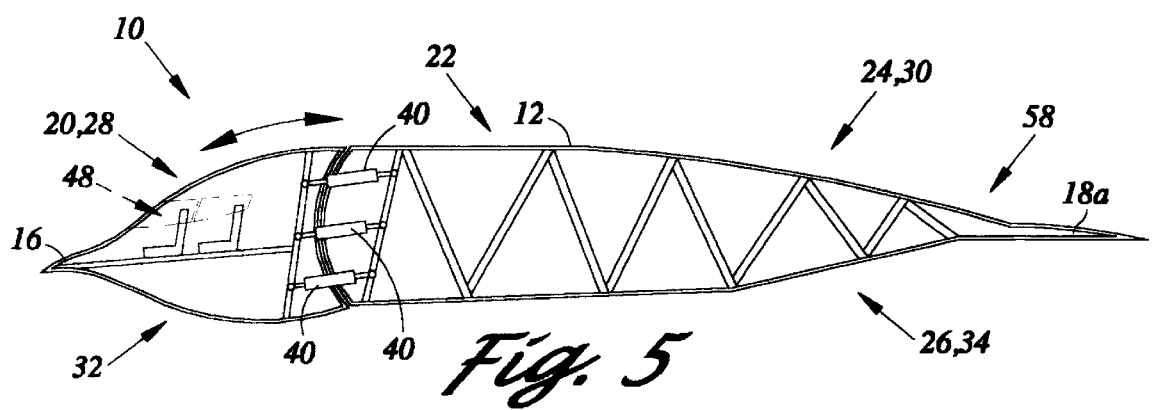
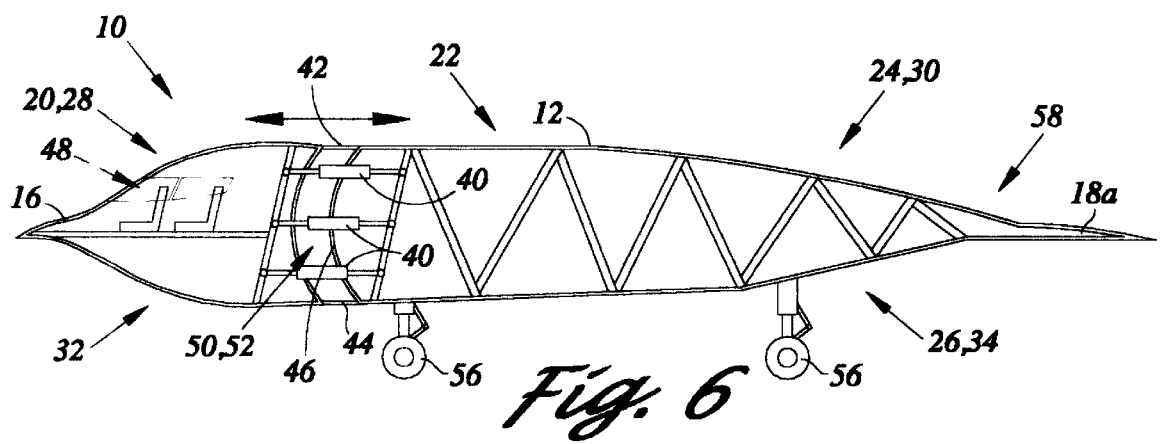

DELTA-SHAPED AIRCRAFT WITH VARIABLE CAMBER FUSELAGE AND WING

FIELD OF THE INVENTION

The present invention relates generally to air vehicles, and more particularly to a delta-shaped aircraft having an integrated wing and fuselage configuration which is deflectable for changing the camber of the aerodynamic lifting surface of the aircraft.

BACKGROUND OF THE INVENTION

Delta-shaped aircraft are characterized by highly swept-back wings and a relatively low aspect ratio which results in a generally triangular planform. While conventionally shaped aircraft are defined by a central fuselage with laterally protruding wings, delta-shaped aircraft have an integrated fuselage and wing configuration. In this respect, typically the modern "stealthy" type of delta-shaped aircraft have an aerodynamic lifting surface which is defined by a central fuselage which smoothly blends with highly swept-back wings. In fact, because of this smooth integration, these aircraft are contemplated as having only a single wing and these aircraft are sometimes referred as being a "flying wing." Some present examples of delta-shaped aircraft include the U.S. military's B-2 bomber and the F-117 stealth fighter.

Due to the increased aerodynamic lifting surface area of these aircraft in comparison to conventional aircraft, delta-shaped aircraft are aerodynamically highly efficient. In addition, these aircraft are designed to have relatively long straight leading edges, albeit swept-back, when viewed topwise or bottomwise. The surface contours, however, are specifically formed to follow smooth continuous curves and having no or few acute angulations, especially right angles. Such surface contouring is contemplated to result in a relatively low overall aircraft radar signature, and thus making delta-shaped aircraft "stealthy."

As one of ordinary skill in the art will appreciate, aircraft must reduce their speed when performing landing operations. To perform this function, conventional aircraft typically employ flaps which are ratably attached to the trailing edges of the wings. The flaps are deflected downward, and in some configurations the flaps are also extended aftward, in order to produce drag, thereby slowing down the aircraft to required landing flight speeds.

Modern stealthy delta-aircraft, however, do not have traditional flaps at the trailing edges of the wings. For example, in the case of the B-2 stealth bomber, the aircraft does not even have downwardly deflectable or aftward extendable flaps for producing drag and slowing the aircraft. These aircraft typically have angled elevons and rudders for their control surfaces which are mounted to the trailing edge of the wing. Among other design constraints, this is due to radar signature mitigation reasons. As such, in addition to reducing engine power, these aircraft reduce their speed for landing operations by approaching the landing area at a relatively high angle-of-attack or nose-up in order to increase drag.

Operating an aircraft at a high angle-of-attack has several implications. Increasing the angle-of-attack with respect to the forward direction of flight tends to increase the lift. Regardless of any increase in the lift due to angle-of-attack effects, as the speed of the aircraft is decreased, at some point additional lift may be required to maintain the desired altitude and possibly prevent a stall condition. As such, several sets of control surfaces called elevons are disposed at the trailing edges of the delta wing. Elevons are angularly disposed with respect to the longitudinal axis or centerline of the fuselage within the horizontal plane. The elevons function much the same as ailerons and elevators for respectively turning and pitching conventional aircraft. Reliance upon the use of elevons or other aerodynamic control surfaces, however, undesirably increases the radar observable signature of the aircraft. Further, use of such aerodynamic control surfaces may necessitate the use of auxiliary control surfaces, such as trim tabs which further tend to increase radar signature.

In addition to increasing the aircraft radar signature and reliance upon control surfaces, operating the aircraft at a high angle-of-attack results in the pilot having poor over the nose visibility or at least obstructed visibility in the forward direction. This is due to the projecting nose of the fuselage obstructing the pilot's forward view and/or downward view of the landing surface. As one of ordinary skill in the art can appreciate, pilot visibility is of an utmost safety concern. For example, nighttime landing operations aboard an aircraft carrier are a potential dangerous undertaking and decreased pilot visibility greatly increases the risk of harm.

As such, based upon the foregoing, there exists a need in the art for an improved method and device, for use with delta-shaped aircraft, which mitigates the aircraft radar signature, reduces the reliance upon control surfaces, and improves aerodynamic lift and pilot visibility in comparison to the prior art.

SUMMARY OF THE INVENTION

In accordance with the present invention, there is provided a variable camber delta-shaped aircraft. The aircraft is provided with an integrated fuselage/wing generally defining the aircraft and having longitudinal and lateral axes. The fuselage/wing has a forward section which is rotably attached to an aft section about the lateral axis. The aircraft is further provided with an aerodynamic lifting surface which is disposed about the fuselage/wing and defined by a camber. The forward section has a downwardly deflected position when rotated relative to the aft section. The forward and aft sections are cooperatively formed to increase the camber of the lifting surface when the forward section is in the deflected position. Movement of the forward section is accomplished via the provision of an actuator device which mechanically couples the forward and aft sections for moving the forward section relative to the aft section.

In the preferred embodiment of the present invention, the fuselage/wing has a flexible external skin which is interposed between the forward and aft sections. In this respect the flexible external skin sealably engages the forward and aft sections and defines the aerodynamic lifting surface thereat.

In addition, the forward section has an extended position which is translated along the longitudinal axis away from the aft section. Such extended position facilitates the formation of an airflow channel interposed between the forward and aft sections when the forward section is in the extended position for allowing airflow therethrough. Such airflow is contemplated to alter the aerodynamic characteristics of the lifting surface. Further, when the forward section is in the extended position is contemplated that an access channel may be formed between the forward and aft sections for allowing access to the cockpit therethrough. The cockpit may be disposed either within the forward or aft sections.

The variable camber delta-shaped aircraft constructed in accordance with the present invention presents numerous advantages not found in related prior art systems. In this respect, the present system is constructed so as to increase aerodynamic lift while the aircraft is flow at a relatively high angle-of-attack. In practice, the delta-shaped aircraft may be required to operate in high angle-of-attack envelopes, in order to slow the aircraft for landing for example. By rotating the forward section of the fuselage/wing, the camber of the aerodynamic lifting surfacing is increased. Such cambering increases the lift while the aircraft slows and therefore extends the flight envelope to prevent a stall condition. Moreover, because the increased camber results in increased lift, reliance on and usage of control surfaces to gain lift are reduced. In this respect, the radar signatures associated with actuation of such control surfaces are also reduces.

Importantly, rotating the forward section into its downwardly deflected position increases the pilot's over the nose visibility when the aircraft is flow at a high angle-of-attack. In the case where the cockpit is located within the rotating forward section, the downward visibility is increased as the forward section is deflected. Where the cockpit is located within the aft section, the forward section acts as a visual obstruction which is mitigated as the forward section articulates downward.

As such, the present invention represents an advance in the art.

BRIEF DESCRIPTION OF THE DRAWINGS

These, as well as other features of the present invention, will become more apparent upon reference to the drawings wherein:

FIG. 4 is a symbolic cross-sectional view of the aircraft of FIG. 1 as seen along axis 4—4;

FIG. 5 is a symbolic cross-sectional view of the aircraft of FIG. 4 with the forward section in a deflected position; and FIG. 6 is a symbolic cross-sectional view of the aircraft of FIG. 4 with the forward section in an extended position.

DETAILED DESCRIPTION OF THE PREFERRED EMBODIMENT

Figure 1:
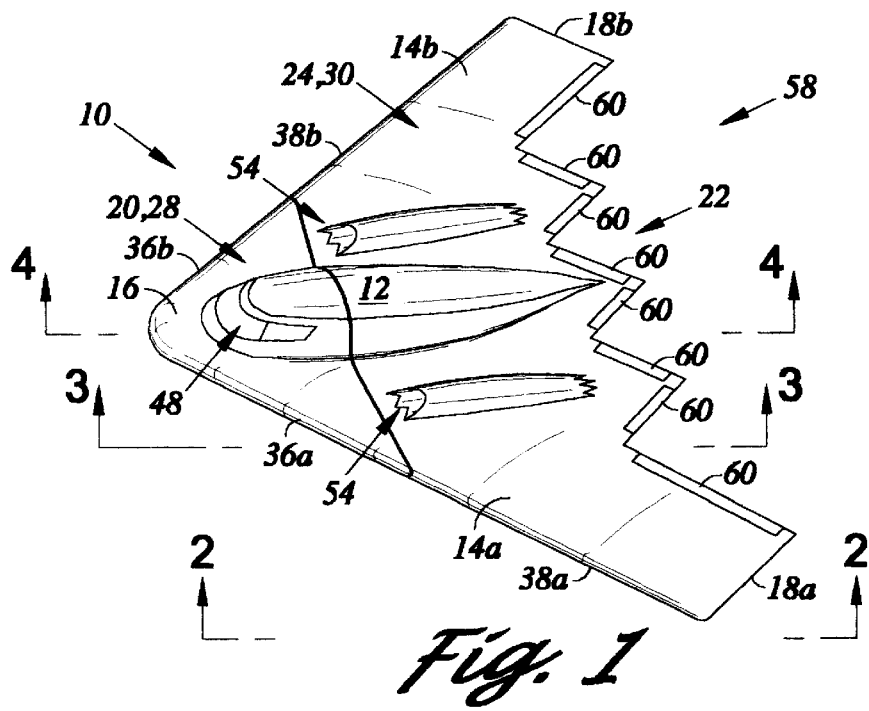
FIG. 1 is a perspective view of the delta-shaped aircraft of the present invention.
Figure 2:
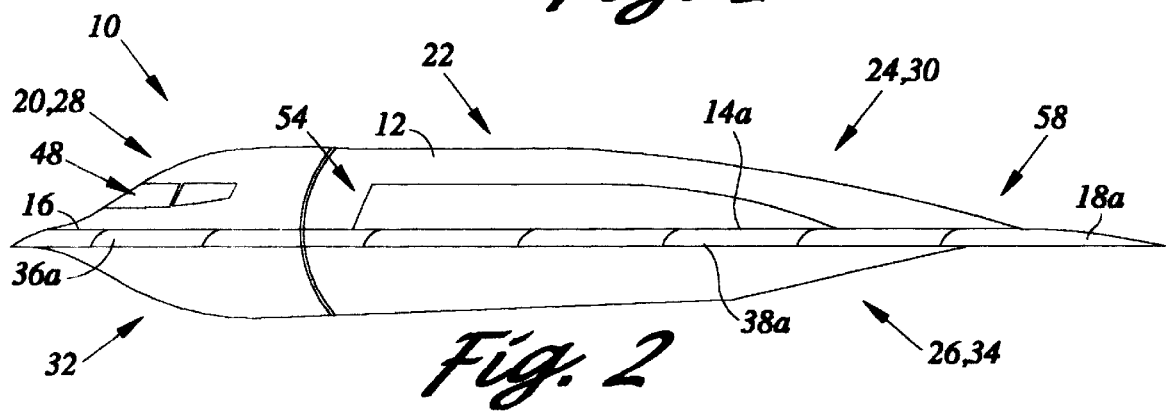
FIG. 2 is a side view of the delta-shaped aircraft of FIG. 1.
Figure 3:
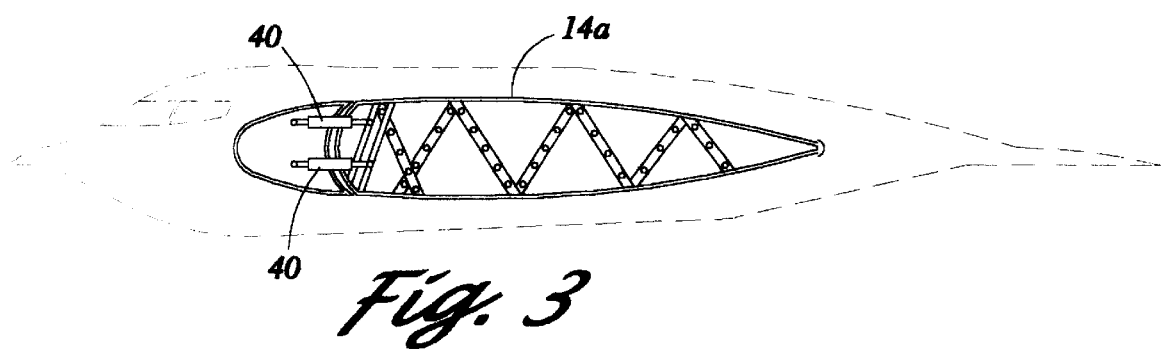
FIG. 3 is a symbolic cross-sectional view of the aircraft of FIG. 1 as seen along axis 3—3.

Referring now to the drawings wherein the showings are for purposes of illustrating a preferred embodiment of the present invention only, and not for purposes of limiting the same, FIGS. 1–6 illustrate a delta-shaped aircraft 10 which is constructed in accordance with the present invention have a variable camber fuselage and wing.

In accordance with the present invention, there is provided a variable camber delta-shaped aircraft 10. The aircraft 10 has a longitudinal axis and is provided with a central fuselage 12 therealong. A pair of opposing swept-back wings 14a, 14b extend laterally and in an aftward direction from the fuselage 12. The wings 14a, 14b have an outer contour which blends smoothly and continuously with that of the fuselage 12. In this respect the fuselage 12 is completely integrated with the wings 14a, 14b. As one of ordinary skill in the art will appreciate such smooth integration is contemplated to give the entire aircraft 10 the appearance and functionality of being a single wing. Thus, the integrated fuselage/wing configuration generally defines the aircraft 10. As such, the aircraft 10 may be characterized by having a relatively low aspect ratio which results in a generally triangular or delta-shaped planform. Some present examples of aircraft having fuselage/wing configuration suitable for use in the present invention include the U.S. military's B-2 bomber and the F-117 stealth fighter and those which are chosen from those well known to one ordinary skill in the art. The fuselage 12 is provided with a nose 16. The wings 14a, 14b are respectively have a wing tips 18a, 18b. The wings 14a, 14b extend in an aftward direction from the nose 16 and terminate at the wing tips 18a, 18b thereof. It is contemplated that the wings 14a, 14b may originate at the nose 16 or at some point aftward along the longitudinal axis from the central fuselage 12.

The aircraft 10 is provided with a forward section 20 which is rotably mounted to an aft section 22 about a lateral axis which is orthogonal to the longitudinal axis. While the lateral axis is symbolically depicted to be fixed with respect to the forward and aft sections 20, 22 it is contemplated that the lateral axis may itself translate.

The aircraft 10 is generally provided with an upper and lower surfaces 24, 26. The upper surface 24 has forward and aft portions 28, 30 respectively associated with the forward section 20 of the aircraft 10. Similarly, the lower surface 24 has forward and aft portions 32, 34 respectively associated with the aft section 22 of the aircraft 10. Thus, the upper surface 24 is contemplated to encompass both the fuselage 12 and the wings 14a, 14b. In addition, the wings 14a, 14b respectively have inboard leading edges 36a, 36b respectively associated with the forward section 20 of the aircraft 10. The wings 14a, 14b further respectively have outboard leading edges 38a, 38b respectively associated with the aft section 22 of the aircraft 10. The inboard leading edges 36a, 36b are preferably sized and configured to be in alignment with the outboard leading edges 38a, 38b so as to form a smooth continuous straight contour thereat. It is contemplated that such a straight contour is especially desirable in light of radar signature mitigation considerations.

Importantly, the leading edges 36a, 36b, 38a, 38b of the wings 14a, 14b and the upper surface 24 of the aircraft 10 generally define the aerodynamic lifting surface of the aircraft 10. As such, the aerodynamic lifting surface is disposed about the fuselage 12 and the wings 14a, 14b. The aerodynamic lifting surface is defined by a camber. Such camber is defined by the arced curvature of the upper surface 24 of the aircraft 10 which smoothly blends with the contour of the leading edges 36a, 36b, 38a, 38b. As one skilled in the art will recognize, the camber is intimately associated with the aerodynamic performance of the lifting surface of the aircraft 10.

As mentioned above, the forward section 20 rotably mounted to the aft section 22. In this regard, the forward section 20 has a downwardly deflected position when rotated relative to the aft section 22. The forward section 20 is contemplated to have a normal position in which such member is undeflected. The forward and aft sections 20, 22 are cooperatively formed to increase the camber of the lifting surface when the forward section 20 is rotated or deflected downward relative to the aft section 22. The forward section 20 is contemplated to facilitate a maximum cambering of the aerodynamic lifting surface of the aircraft 10 when it is in its deflected position. The camber of the lifting surface may be incrementally or variably increased as the forward section 20 is rotated through intermediated positions from its normal position to the deflected position. As one of ordinary skill in the art will appreciate the camber is measured relative to the direction of flight of the aircraft 10, and of particular interest is the angle-of-attack.

Movement of the forward section 20 is accomplished via the provision of an actuator device 42 which mechanically couples the forward and aft sections 20, 22 for rotating the forward section 20 relative to the aft section 22. The actuator device 42 is symbolically depicted in FIGS. 3–6. The actuator device 42 may be hydraulic, pneumatic or electromechanical in nature. It is contemplated that the sizing and configuration of the actuator device 42 and supporting linkages are chosen from those well known to one of ordinary skill in the art. U.S. Pat. No. 2,872,137 to Gluhareff, U.S. Pat. No. 2,736,523 to Chaplin, U.S. Pat. No. 3,114,525 to Morgan et al. and U.S. Pat. No. 3,171,620 to Walley et al. disclose actuator devices and supporting linkages which in concept may be incorporated into the aircraft 10 (such prior art patents are incorporated herein by reference). While these prior art patents are limited to disclosure of sectionally rotatable fuselages of aircraft, and not the wings thereof, these prior patents do describe actuation mechanisms which may be instructive to one of ordinary skill in the art with regard to the actuator device 42 of the aircraft 10 of the present invention.

In the preferred embodiment of the present invention, while the forward section 20 is in its normal or deflected positions, the forward and aft sections 20, 22 are in flush or substantially sealed engagement therewith. In this respect, the surface contour of forward and aft portions 28, 30 of the upper surface 24 is formed to smoothly transition from the forward section 20 to the aft section 22. In the preferred embodiment of the present invention, interposed between the forward and aft sections 20, 22 adjacent the upper surface 24 is an upper transition skin 42. The upper transition skin 42 is formed of a flexible polymeric material which spans the gap between the forward and aft sections 20, 22. The upper transition skin 42 is contemplated to facilitate a sealed smooth surface contour transition from the forward section 20 to the aft section 22, in particular, from the forward portion 28 to the aft portion 30 of the upper surface 24. The upper transition skin 42 is formed of a flexible material such that it stretches or elongates upon rotation of the forward section 20 into its deflected position. The method of attachment of the upper transition section 42 to the forward and aft sections 20, 22 and well as other material selections may be chosen from those well known to one of ordinary skill in the art. In a similar fashion, a lower transition skin 44 may be interposed between the forward and aft sections 20, 22 adjacent the lower surface 26. It is contemplated that the upper and lower transition skin may be formed of a single member so as to generally form a gasket or seal between the forward and aft sections 20, 22.

In an alternate embodiment of the present invention, where the upper transition skin 44 is not included, the aft section 22 may be provided with a curved frontal surface 46. When the forward section 20 is in its normal position, the curved frontal surface 46 is completely disposed between the forward and aft sections 20, 22. As the forward section is rotated from its normal position, the frontal surface 46 is gradually exposed and defines both the upper surface 24 of the aircraft 10 and the aerodynamic lifting surface thereat.

It is contemplated that the aircraft 10 is provided with a cockpit 48. Although the cockpit 48 is depicted to be located within the forward section 20, is may be located within the aft section 22. Advantageously, the forward section 20 may be provided with an extended position which is translated along the longitudinal axis away from the aft section 22. When the forward section 20 is in the extended position, an access channel 50 is formed between the forward and aft sections 20, 22 for allowing access to the cockpit 48 therethrough. It is also contemplated that the access channel 50 may provide access to equipment which is interior to the aircraft 10, such as the engines. In addition, the forward section 20 may be selectively extended so as to form an airflow channel 52 between the forward and aft sections 20, 22 for allowing airflow to pass therethrough. Such airflow is contemplated to pass from the lower surface 26 to the upper surface 24 for altering the aerodynamic characteristics of the lifting surface thereat.

In addition, the aircraft 10 may be provided with engine air intakes 54. Although the air intakes 54 are depicted as being located within the aft section 22, the air intakes 54 may be located within the forward section 20. Further, the aircraft 10 may be provided with landing gear 56. Although the landing gear 56 is depicted as being located at the aft section 22, the landing gear 56 or at least a portion thereof may be located at the forward section 20 as well.

The wings 14*a*, 14*b* are provided with trailing edges 58 with control surfaces 60 disposed thereat. In the case of a B-2 type of delta-shaped aircraft, the control surfaces 60 may take the form of elevons and rudders. The control surfaces 60 may also take the form of ailerons, elevators, trim tabs and those which are well known to one of ordinary skill in the art.

In operation, when flying the aircraft 10 horizontally with respect to the direction of flight (i.e., no angle-of-attack), the forward section 20 would be in its normal position. The forward section 20 may be rotated toward its deflected position to increase aerodynamic lift. The downward deflectability of the forward section 20 is most appreciated, however, when the aircraft must operate at a high angle-of-attack, such as during landing operations. As one of ordinary skill in the art will appreciate, when the aircraft 10 is flown at a high angle-of-attack, the aircraft speed is reduced. The pilot on landing approach will adjust the control surfaces 60 so as to pitch the nose 16 of the aircraft 10. In order to maintain a desired altitude or to prevent a stall condition, however, an increase in aerodynamic lift may be desired. As such, the forward section 20 may be selectively rotated downward toward the deflected position with a corresponding increase in aerodynamic lift. This is due to the increase in camber of the aerodynamic lifting surface as the forward section 20 is rotated.

In addition, as the aircraft 10 approaches the landing surface at a high angle-of-attack, the over-the-nose pilot visibility is reduced. By articulating or rotating the forward section 20 visibility is increased. In particular, where the cockpit 48 is disposed within the forward section 20 of the aircraft 10, rotation of the forward section 10 inherently rotates the pilot's visual viewing are downward and thus increases downward or over-the-nose visibility. There the cockpit 48 is disposed within the aft section 22 of the aircraft 10, the forward section 20 represents a visual obstacle or boundary for the pilot. Rotation of the forward section 20, however, tends to expand the pilot's downward or over-the-nose view, and thus increases pilot visibility.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A variable camber delta-shaped aircraft comprising:

an integrated fuselage/wing generally defining the aircraft and having longitudinal and lateral axes, the fuselage/ wing having a forward section rotably attached to an aft section about the lateral axis; and an aerodynamic lifting surface disposed about the fuselage/wing and defined by a camber;

wherein the forward section having a downwardly deflected position when rotated relative to the aft section, the forward and aft sections being cooperatively formed to increase the camber of the lifting surface when the forward section is in the deflected position.

2. The delta-shaped aircraft of claim 1 wherein the aerodynamic lifting surface having a pair of swept back leading edges, the leading edges having a pair of inboard portions and a pair of outboard portions, the inboard portions being interposed between the longitudinal axis and the outboard portions, the inboard portions being disposed on the forward section of the fuselage/wing, the outboard portions being disposed on the aft section of the fuselage/wing.

3. The delta-shaped aircraft of claim 1 wherein the fuselage/wing further having an actuator device mechanically coupling the forward and aft sections for moving the forward section relative to the aft section.

4. The delta-shaped aircraft of claim 3 wherein the actuator device is a hydraulic device.

5. The delta-shaped aircraft of claim 1 wherein the fuselage/wing having a flexible external skin interposed between the forward and aft sections and defining the aerodynamic lifting surface thereat.

6. The delta-shaped aircraft of claim 1 wherein the forward section having an undeflected position with respect to the aft section, the forward and aft sections being in substantially sealed engagement therebetween when the forward second is in the undeflected position.

7. The delta-shaped aircraft of claim 1 wherein the forward section having an extended position translated along the longitudinal axis away from the aft section, the fuselage/wing having an airflow channel interposed between the forward and aft sections when the forward section is in the extended position for allowing airflow therethrough.

8. The delta-shaped aircraft of claim 1 wherein the forward section having a cockpit adjacent the aft section.

9. The delta-shaped aircraft of claim 8 wherein the forward section having an extended position translated along the longitudinal axis away from the aft section, the fuselage/wing having an access channel interposed between the forward and aft sections when the forward section is in the extended position for allowing access to the cockpit therethrough.

10. The delta-shaped aircraft of claim 1 wherein the aft section having a cockpit disposed adjacent the forward section.

11. The delta-shaped aircraft of claim 10 wherein the forward section having an extended position translated along the longitudinal axis away from the aft section, the fuselage/wing having an access channel interposed between the forward and aft sections when the forward section is in the extended position for allowing access to the cockpit therethrough.

* * * * *